(12) United States Patent
Wang

(10) Patent No.: US 7,574,806 B2
(45) Date of Patent: Aug. 18, 2009

(54) ADJUSTMENT STRUCTURE OF GARDEN SHEARS

(76) Inventor: Kuang-Pin Wang, No. 80, Alley 121, Lane 516, Sec. 2, Sinan Rd., Wurih Township, Taichung County 414 (TW)

( * ) Notice: Subject to any disclaimer, the term of this patent is extended or adjusted under 35 U.S.C. 154(b) by 525 days.

(21) Appl. No.: 11/544,578

(22) Filed: Oct. 10, 2006

(65) Prior Publication Data

US 2008/0085150 A1 Apr. 10, 2008

(51) Int. Cl.
*B25G 1/00* (2006.01)
*G01B 3/08* (2006.01)
*B25G 1/04* (2006.01)
*B25G 3/00* (2006.01)

(52) U.S. Cl. .............................. 30/340; 30/341; 33/809; 33/483; 16/429; 403/27

(58) Field of Classification Search ................... 30/340, 30/341; 16/429, 113.1, DIG. 25; 33/809, 33/483, 679.1, 296; 403/27, 109.1, 109.3
See application file for complete search history.

(56) References Cited

U.S. PATENT DOCUMENTS

| | | | | |
|---|---|---|---|---|
| 3,762,058 A | * | 10/1973 | Heater | 33/809 |
| 5,387,048 A | * | 2/1995 | Kuo | 403/109.3 |
| 6,688,012 B1 | * | 2/2004 | Crain et al. | 33/296 |
| 6,883,208 B1 | * | 4/2005 | Huang | 16/429 |

* cited by examiner

*Primary Examiner*—Victor MacArthur
(74) *Attorney, Agent, or Firm*—Rosenberg, Klein & Lee

(57) ABSTRACT

An adjustment structure of garden shears, which utilizes an aligning lever disposed on the outer surface of an outer tube to support a protruding block; because the protruding block can be fitted into a trough on the outer surface of the inner tube and become secured, the inner tube and the outer tube become fastened together as a result. Moreover, a marked unit is disposed where said inner tube and outer tube are joined, thereby allowing the invention to have a structurally simple handle that can be aligned effectively, which in turn allows users to grasp the precision in the movement between said inner tube and outer tube.

2 Claims, 8 Drawing Sheets

ADJUSTMENT STRUCTURE OF GARDEN SHEARS

BACKGROUND OF THE INVENTION

1. Field of the Invention

The invention relates to an adjustment structure of garden shears. More particularly, the invention relates to an adjustment structure having a simple structure and being effective for aligning handles.

2. Description of Prior Art

FIG. 7 shows the adjustment structure of handles in a prior art; an end of outer handle 81 of the handle 8 is disposed with a fastening member for the outer tube 82, the fastening member for the outer tube 82 allows a base member 83 to fit through, so that said base member 83 can be rotated on the fastening member for the outer tube 82; said base member 83 is joined with a rod 84 with square cross section, and a carrier member 85 is fitted on said rod 84; said carrier member 85 has a square opening 851 for said rod 84 to fit through, thus making carrier member 85 rotate along with said rod 84 when it is rotated.

The carrier member 85 has a protruding pole 852, the end of protruding pole 852 near said carrier member 85 has an off-centered section 853, said off-centered section 853 is fitted with an off-centered block 86 shaped as an ellipsoid, and a hook portion 854 in the shape of a loop is disposed on the other end of protruding pole 852.

The inner tube 87 being fittable into the outer tube 81, and one of its end is disposed with a fastening member for the inner tube 88, said fastening member for the inner tube 88 has a through opening 881 for the protruding pole 852 of said carrier member 85 to fit through, and it is fastened and secured onto said fastening member for the inner tube 88 by the use of hook portion 854 on the protruding pole 852, thus making said carrier member 85 rotatable on said fastening member for the inner tube 88.

In the structure described above, said carrier member 85 begins to rotate when said base member 83 is rotated and in turn makes rod 84 rotate as well, as a result, the off-centered section 853 on said carrier member 85 is also rotated, thereby pushing the off-centered block 86 against the inner wall 811 of the outer tube 81, as shown in FIGS. 8 to 9; the friction generated from pushing the off-centered block 86 against the inner wall 811 allows the inner and outer tubes 87 and 81 to be aligned.

However, because the adjustment structure of the handles are more complex; the off-centered block 86 is made of plastic, and also compounded by the fact that the off-centered block 86 is pushed against the inner wall 811 of the outer tube 81 on only one tilted lateral side to achieve alignment; the off-centered block 86 becomes prone to contortion after a period of usage. As a result, the holding strength of the off-centered block 86 becomes insufficient over time, and thus it is necessary to improve the adjustment structure of the handles in a prior art.

SUMMARY OF THE INVENTION

The main objective of the invention is to propose an adjustment structure of garden shears that can solve the problems described above; it uses an aligning lever disposed on the outer surface of the outer tube to lean against a protruding block, because the protruding block can fit into a cavity on the outer surface of the inner tube and become secured, thereby allowing the inner and outer tubes to be fastened together, the adjustment structure of the invention is structurally simple and effective for aligning handles.

Another objective of the invention is to propose the formation of a stopper in the cavity on the outer surface of the inner tube for obstructing the protruding block when users adjust the length of the inner and outer tubes, so that the inner tube and the outer tube would not become separated.

A further objective of the invention is to propose the formation of a marked unit where the inner tube and the outer tube are joined, so that users can clearly grasp the precision in the movement between the inner tube and the outer tube with the use of said marked unit.

In order to achieve the objectives described above, the invention is comprised of:

an outer tube, one end of said outer tube being disposed with a grab handle;

an inner tube being fitted into said outer tube, a trough being disposed on the outer surface of said inner tube, and a cavity is formed in said trough where it corresponds to and holds a stopper;

an aligning member being located where said outer tube and inner tube are joined, said aligning member has a through hole for a protruding block to fit through;

an aligning board being joined with said aligning member with the use of a pin.

DETAILED DESCRIPTION OF PREFERRED EMBODIMENT

FIGS. 1 to 6 illustrate the selected embodiments of this invention; the embodiments only serve the purpose of elucidation and are not to be used to limit the scope of the invention in any ways.

Figure 1:
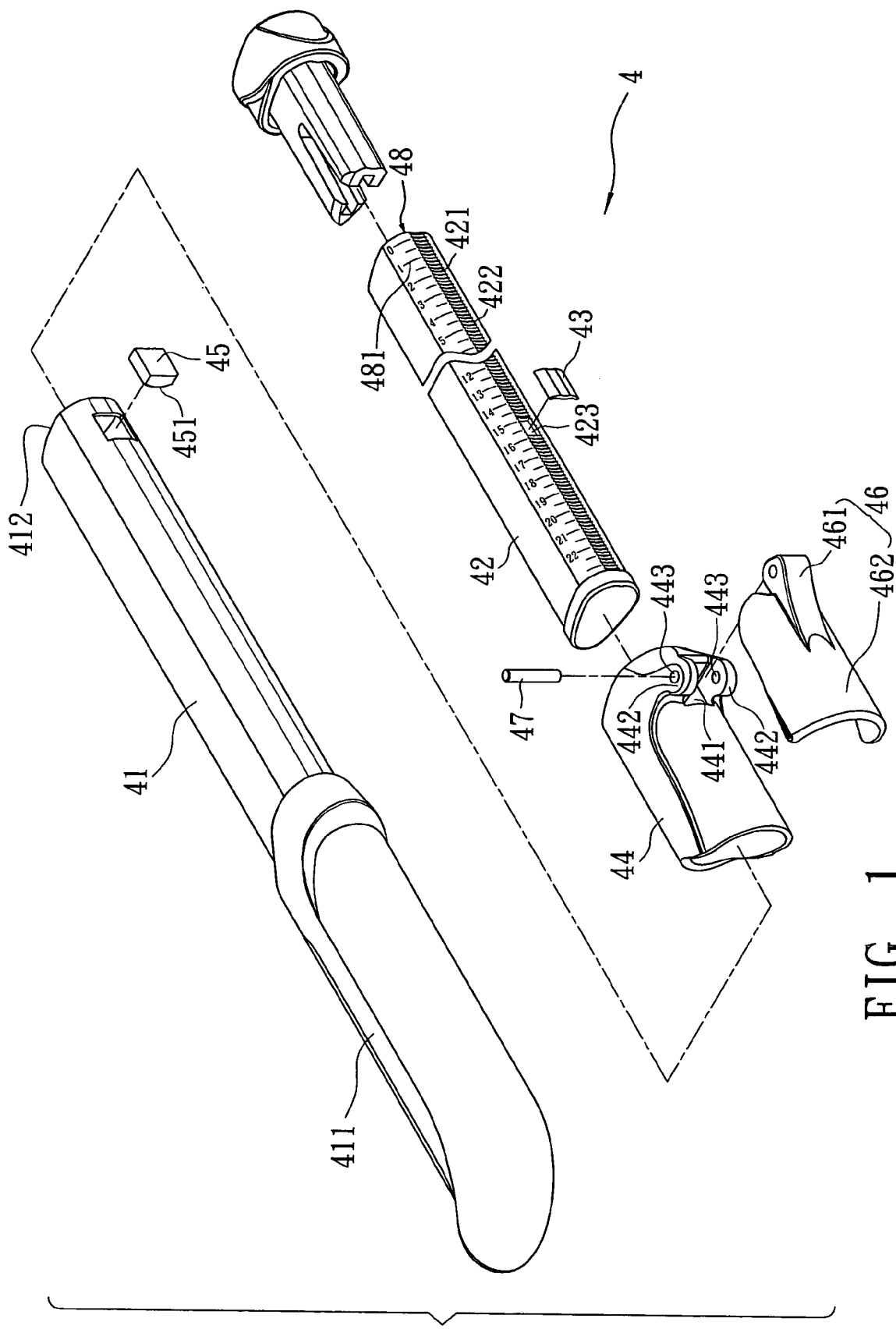
FIG. 1 is the view showing the invention in full assemblage.
Figure 2:
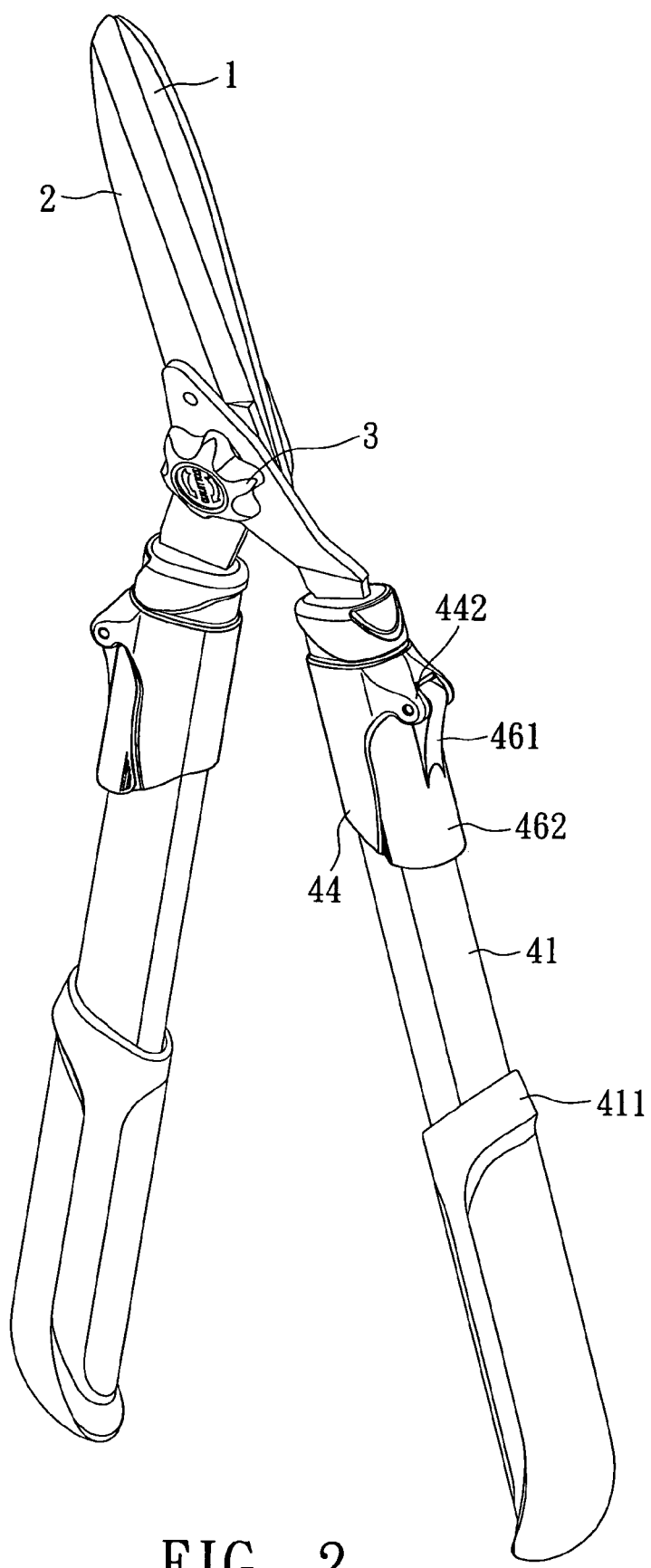
FIG. 2 is a schematic view showing the invention being applied in the garden shears.

The adjustment structure of garden shears of this embodiment, as shown in FIG. 1 and FIG. 2, comprising:

a first blade 1 and a second blade 2 being crossly joined together, said first and second blades 1 and 2 are crossly joined by the use of a removable rotating button 3; in this embodiment, since said first blade 1 and second blade 2 both connect to an identical adjustment structure 4, only one adjustment structure 4 is required as an example for the purpose of further explanation, said adjustment structure 4 comprising:

an outer tube 41, one end of said outer tube 41 being disposed with a grab handle 411.

an inner tube 42 being fitted into said outer tube 41, a trough 421 being disposed on the outer surface of said inner tube 42, the inner surface of said trough 421 has a plurality of grooves 422, and a cavity 423 is formed in said trough 421 where it corresponds to and holds a stopper 43.

an aligning member 44 being located at where said outer tube 41 and inner tube 42 are joined, said aligning member 44 has a through hole 441 for a protruding section 451 of a protruding block 45 to fit through; in this embodiment, the protruding section 451 of said protruding block 45 has a secondary grooved section 452 for allowing it to become more fastened with the grooves 422 on the inner surface of said trough 421; said through hole 441 has a lug 442 on both lateral sides, respectively, each lug 442 corresponds to one another and has respective through opening 443.

an aligning board 46 being joined with said aligning member 44 by the use of a pin 47 being fitted through each of said through opening 443 in each said lug 442; in this embodiment, said aligning board 46 comprises a pressing portion 461 and a curved portion 462, said curved portion 462 becomes supportive of said protruding block 45 when said pressing portion 461 is pressed downwards.

a marked unit 48 being disposed on the two lateral sides of said trough 421 on the outer surface of said inner tube 42, said marked unit 48 is consisted of a surface 412 of said outer tube 41 that faces away from one end of said grab handle 411, and a marked line 481 corresponding to said surface 412 and located at the two lateral sides of said trough 421 on the outer surface of said inner tube 42, for allowing precise movement between said inner tube 42 and outer tube 41.

Figure 3:
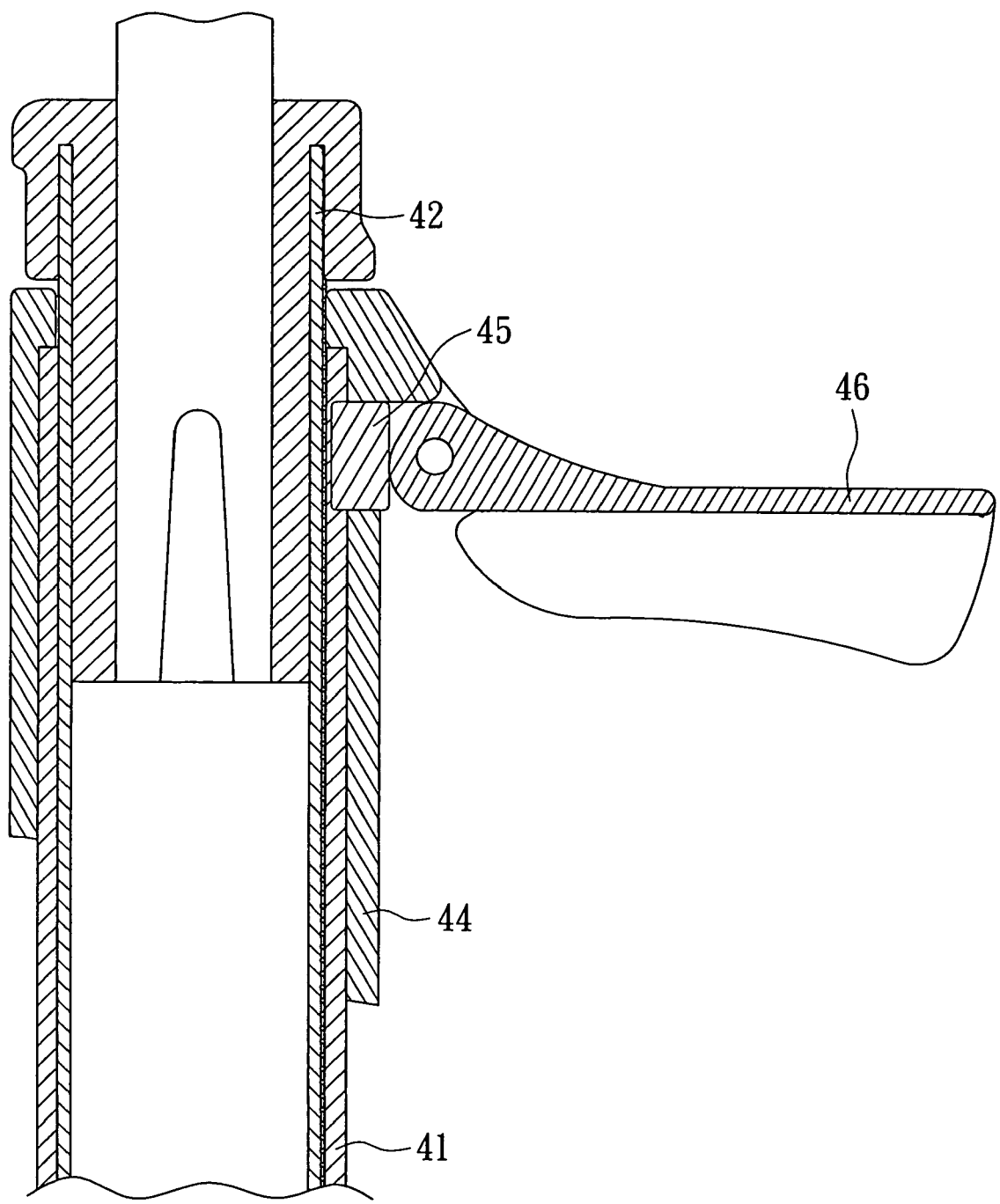
FIG. 3 is a schematic view showing the length of the adjustable outer tube of the invention.
Figure 4:
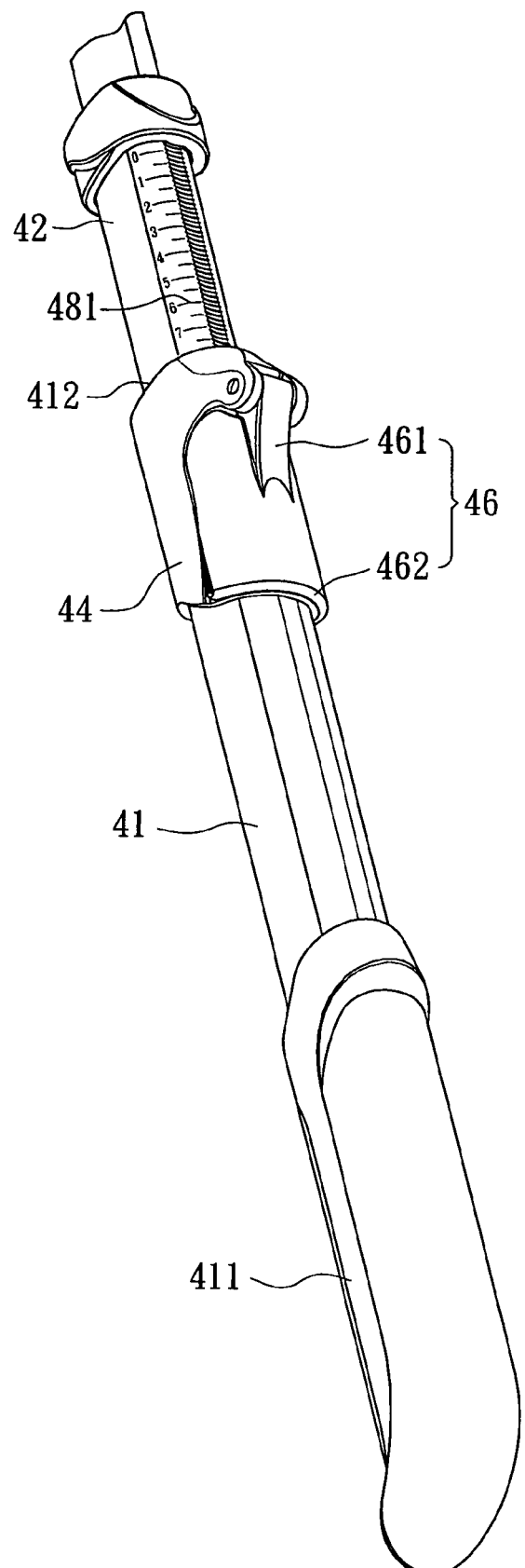
FIG. 4 is a partial schematic view showing the marked unit of the invention.

The use of the adjustment structure of garden shears in this invention is further explained with the aid of relevant figures below:

Referring to FIG. 3, when the length of outer tube 41 is to be adjusted, the pressing portion 461 of the aligning board 46 should be pushed upwards at first, so that the curved portion 462 no longer supports the protruding block 45 of aligning member 44, and protruding block 45 becomes loosened and no longer fastened with the trough 421 of inner tube 42; subsequently, the outer tube 41 can be adjusted along the outer surface of the inner tube 42, and users can judge the precision in the movement between the outer tube 41 and the inner tube 42 by observing whether the surface 412 of outer tube 41 is aligned to marked line 481 on the outer surface of inner tube 42 or not. In other words, when the surface 412 of outer tube 41 is aligned to marked line 481 on the outer surface of inner tube 42, it means the inner and outer tubes 42 and 41 are moved horizontally, as shown in FIG. 4; in contrast, if the surface 412 of outer tube 41 cannot be aligned to marked line 481 on the outer surface of inner tube 42, it means the inner tube 42 and the outer tube 41 are slanted. As a result, the invention allows users to clearly grasp the precision in the movement between the inner tube 42 and the outer tube 41.

Figure 5:
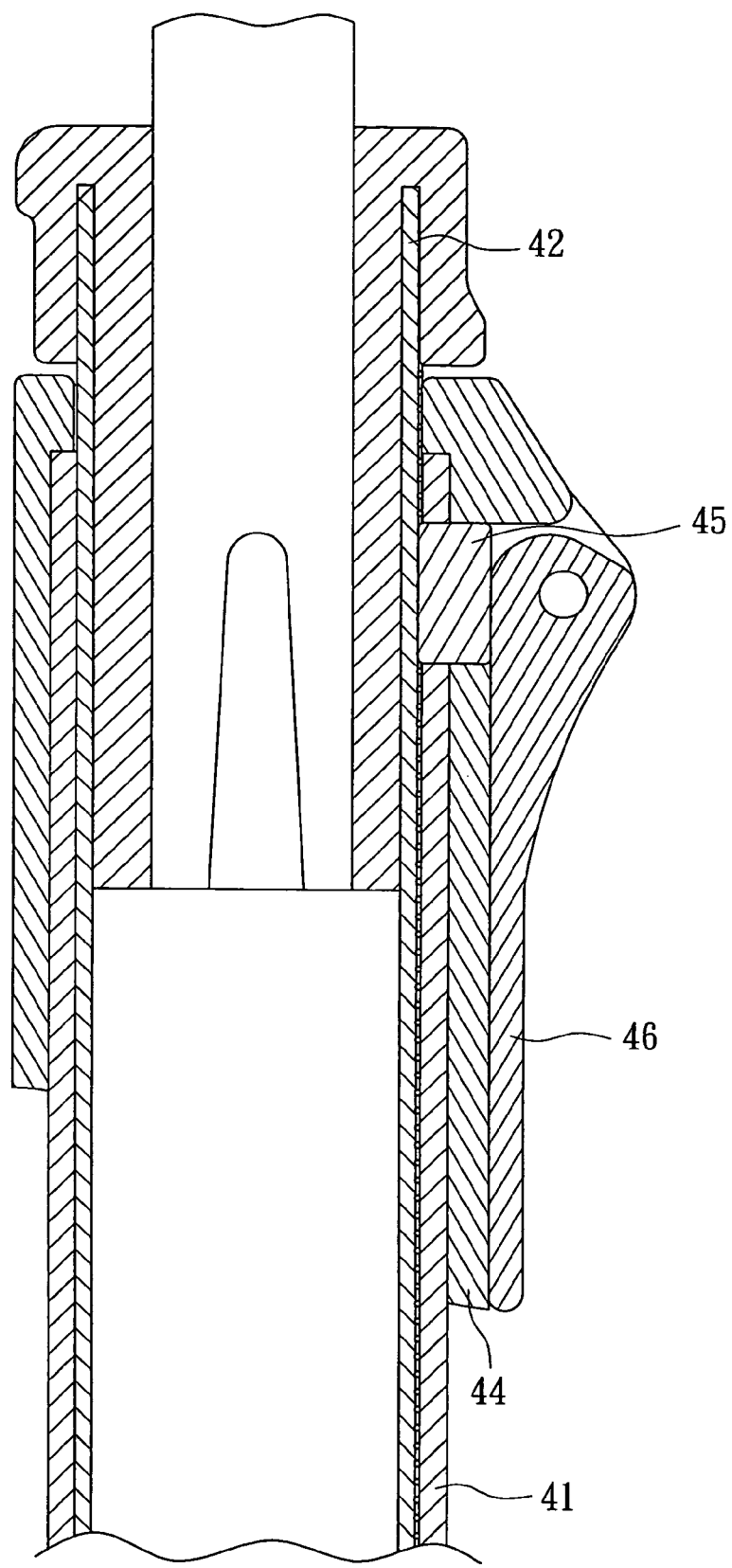
FIG. 5 is a view indicating the relationship between the protruding block and the trough of the inner tube of the invention.

Subsequently, when the outer tube 41 is adjusted to adequate length, users can press the pressing portion 461 downwards to make the curved portion 462 support said protruding block 45 after the application of force, and then the protruding block 45 will become fastened together with trough 421 of the inner tube 42, as indicated in FIG. 5.

Because protruding block 45 can be fastened into trough 421 on the outer surface of inner tube 42, thereby allowing the inner tube 42 and the outer tube 41 to be secured, thus the invention is not only structurally simple, but also effective for aligning the handles.

Figure 6:
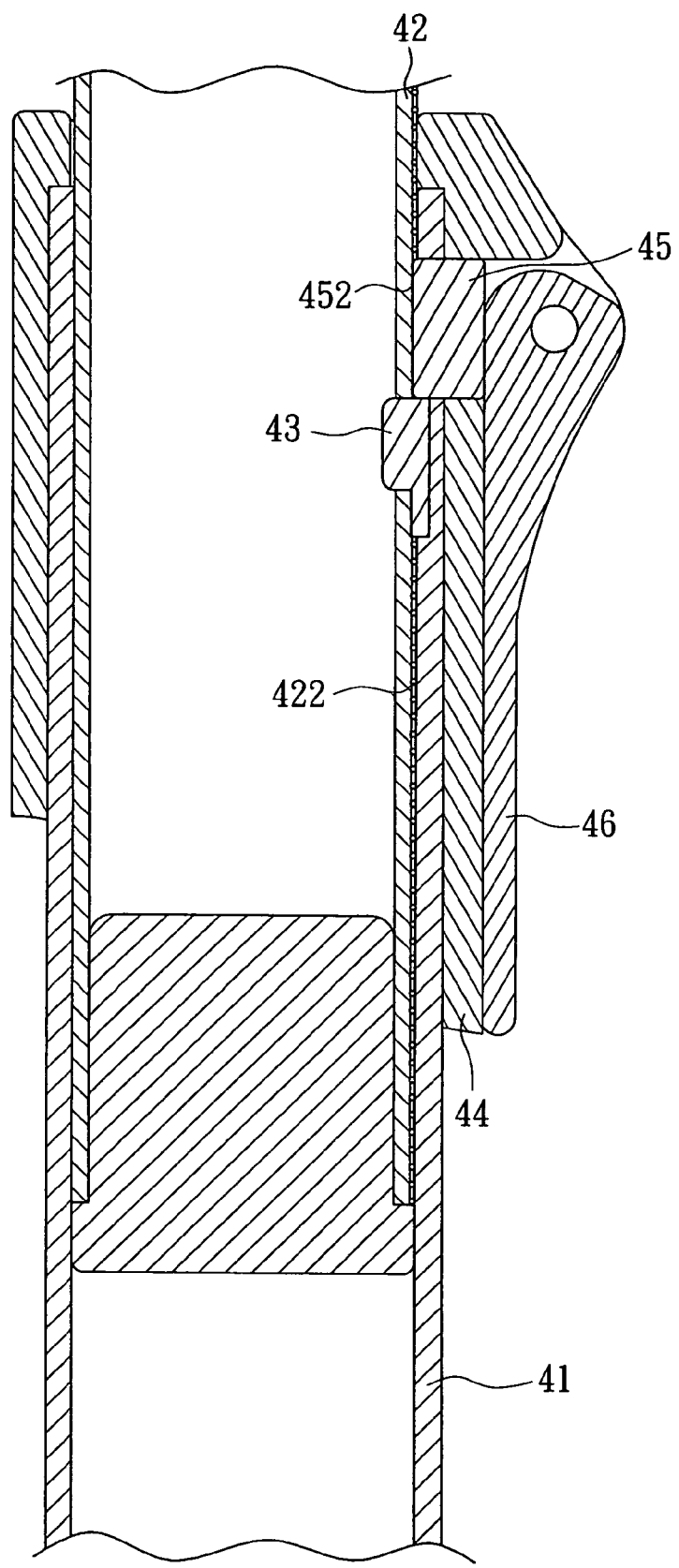
FIG. 6 is a schematic view showing the stopper blocking the protruding block in the invention.
Figure 7:
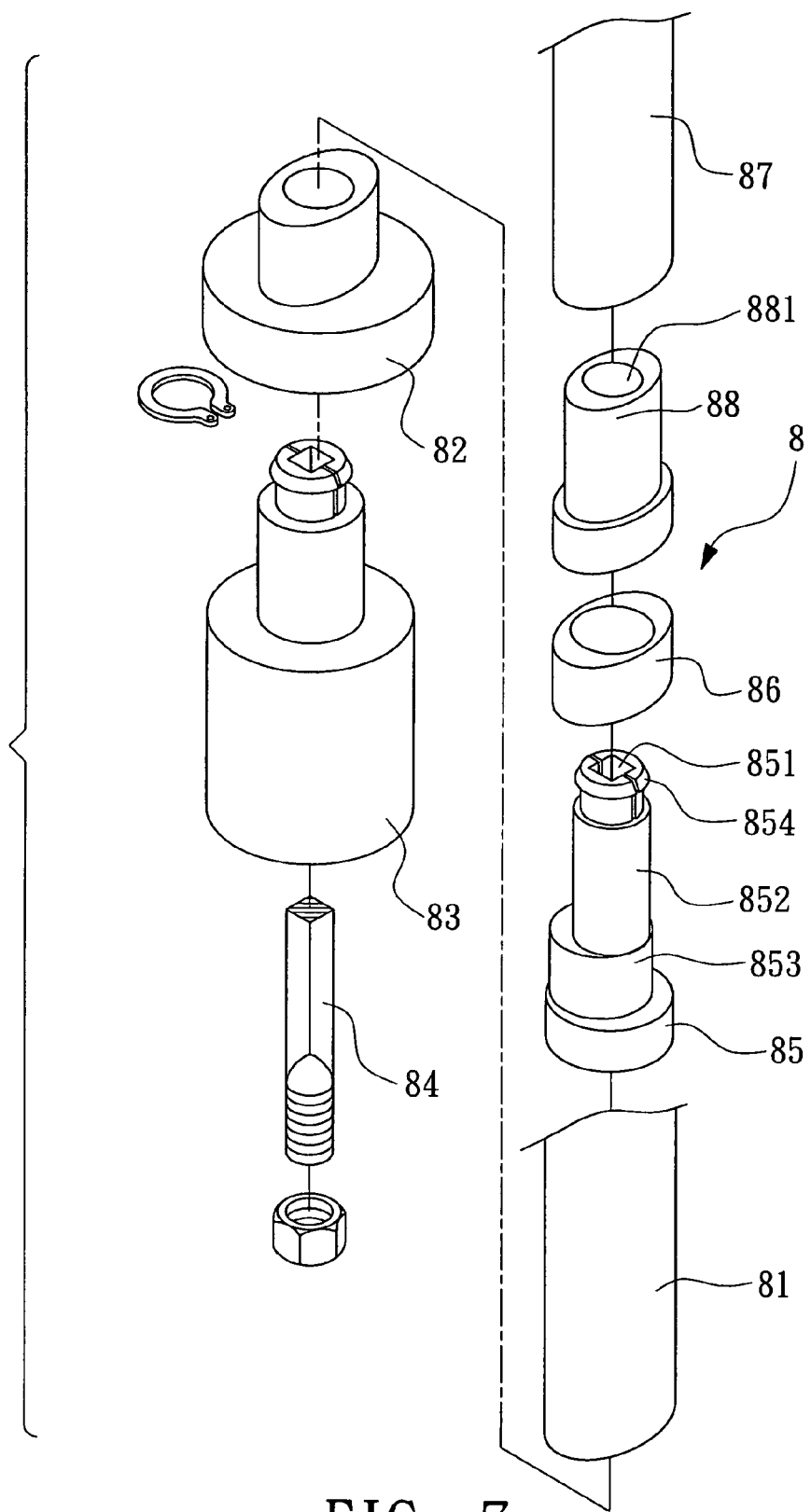
FIG. 7 is a three-dimensional dissected view showing the adjustment structure of handles in a prior art.
Figures 8, 9:
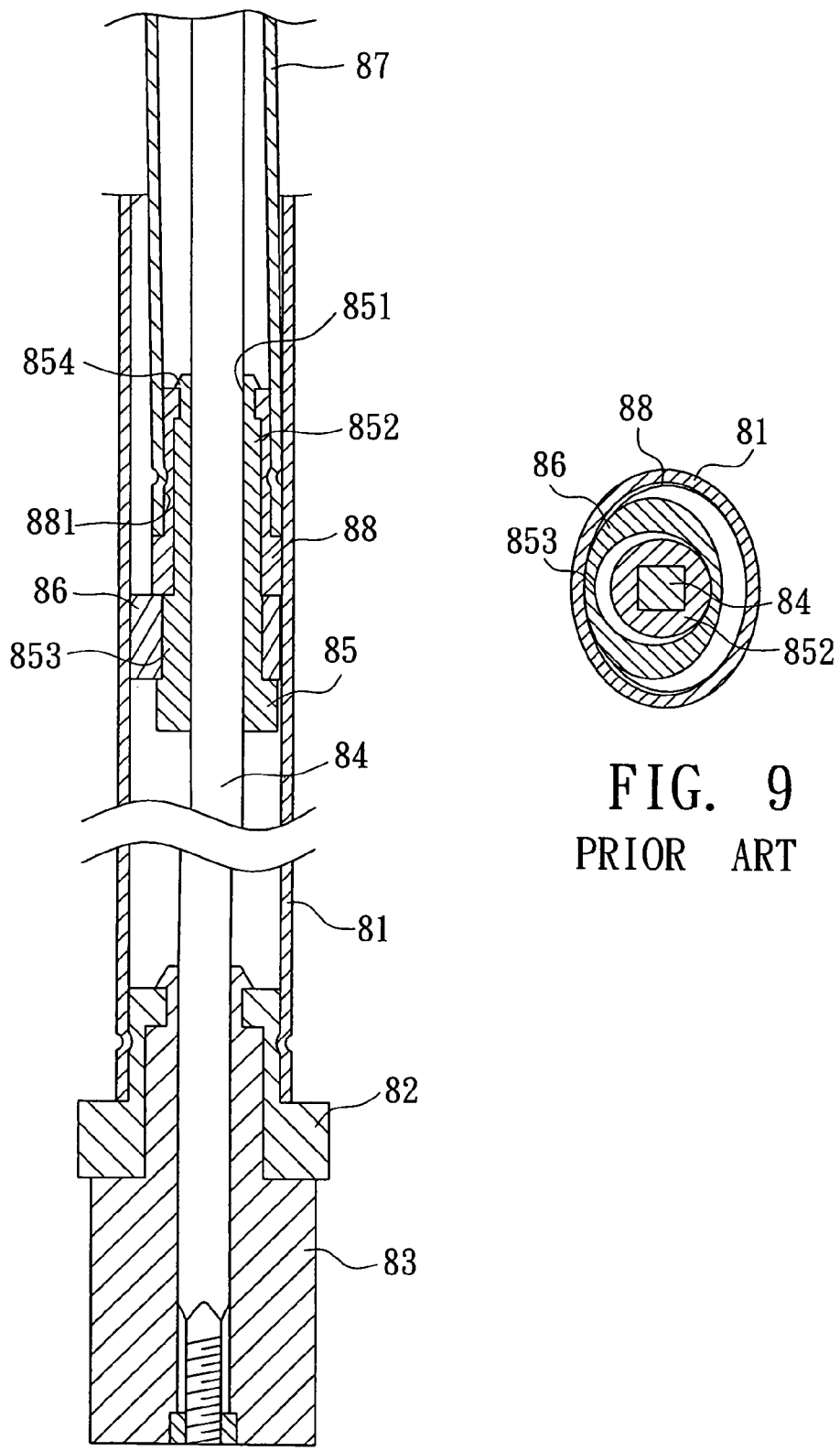
FIG. 8 is the first schematic view showing the usage of the adjustment structure of handles in a prior art.
FIG. 9 is the second schematic view showing the usage of the adjustment structure of handles in a prior art.

Furthermore, because a stopper 43 is disposed in a cavity 423 on the outer surface of said inner tube 42 in this invention, thereby allowing an adjustable distance of adequate length to be placed between the inner tube 42 and the outer tube 41, thus said stopper 43 can stop the protruding block 45 when users are adjusting the length between the inner tube 42 and the outer tube 41, so that the inner tube 42 and the outer tube 41 will not become separated, as indicated in FIG. 6.

What is claimed is:

1. Garden shears having first and second blades crossly joined to one another by a rotating button, and a pair of identical adjustment structures, each adjustment structure comprising:

an inner tube fixing a respective one of said blades thereto, a trough longitudinally disposed on an outer surface of said inner tube, a plurality of grooves formed longitudinally along said trough, a cavity formed through said trough, a stopper extending perpendicularly through said cavity into an interior of said inner tube, an outer tube having a first end receiving said inner tube to telescope therein, a grab handle fixing a second end of said outer tube therein, an aligning member fixing said outer tube first end therein at a location where said outer tube and inner tube are joined, a through hole extending through said aligning member, a protruding section of a protruding block fitting perpendicularly through said through hole, an alignment board pivotably connected to said aligning member by a pin, said alignment board having a pressing portion and a curved portion, whereby the inner and outer tubes can be precisely positioned when an end surface of the outer tube first end is visually aligned with a numbered marking of a marked measuring line on said outer surface of said inner tube and the pressing portion is pressed downward to force said curved portion against said protruding block causing a secondary grooved section of said protruding section to lockingly clamp against said grooves of said trough.

2. The adjustment structure of garden shears of claim 1, wherein said through hole has a lug on both lateral sides, respectively, each lug corresponds to one another and has a respective through opening for said pin to fit through.

\* \* \* \* \*